United States Patent [19]
Eklöf

[11] Patent Number: 5,890,286
[45] Date of Patent: Apr. 6, 1999

[54] BALL VALVE WITH FULL OPENING AND A METHOD FOR ITS MANUFACTURE

[75] Inventor: Hannu Eklöf, Voiluoto, Finland

[73] Assignee: Naval Oy, Laitila, Finland

[21] Appl. No.: 793,058

[22] PCT Filed: Aug. 17, 1995

[86] PCT No.: PCT/FI95/00435

§ 371 Date: Jul. 7, 1997

§ 102(e) Date: Jul. 7, 1997

[87] PCT Pub. No.: WO96/05455

PCT Pub. Date: Feb. 22, 1996

[30] Foreign Application Priority Data

Aug. 17, 1994 [FI] Finland ..................................... 943788
Feb. 3, 1995 [FI] Finland ..................................... 950495

[51] Int. Cl.⁶ .................................................. F16K 5/06
[52] U.S. Cl. .................................. 29/890.13; 29/890.132
[58] Field of Search ........................ 251/315.15, 315.16;
29/890.12, 890.13, 890.131, 890.132

[56] References Cited

U.S. PATENT DOCUMENTS

| | | | |
|---|---|---|---|
| 3,411,746 | 11/1968 | Scaramucci | 251/315.15 X |
| 3,545,721 | 12/1970 | Shafer | 25/315.16 X |
| 3,819,150 | 6/1974 | Kajrup . | |

FOREIGN PATENT DOCUMENTS

| | | | |
|---|---|---|---|
| 3532/72 | 6/1973 | Finland . | |
| 2457230 | 6/1975 | Germany | 251/315.15 |
| 3816887 | 11/1989 | Germany | 251/315.15 |
| 2 199 119 | 6/1988 | United Kingdom . | |

*Primary Examiner*—John Fox
*Attorney, Agent, or Firm*—Ohlandt, Greeley, Ruggiero & Perle

[57] ABSTRACT

The invention relates to a ball valve (3) with full opening between two tubes (1, 2) and the manufacturing method thereof. The ends (6, 7) of the tubes are sealed in the valve against the valve ball (5) opening and closing the valve and rotating about its axle (17), the diameters of the flow openings (9, 10) of the valve ball being substantially the same as the diameters of the flow cross sections of the tubes. Around the valve ball and the ends of the tubes there is a sleeve-like casing (8) secured by its ends (15) to the sides of the tubes (1, 2). According to the invention, a protrusion is formed in the ends of both tubes (1, 2), comprising an annular sealing (11), and the casing (8) is formed with a tapered reduction towards its ends so that the valve ball (5) and the ends of the tubes are located in the space (16) defined by the casing (8) of the valve. The valve (3) may be assembled by joining the ends (6, 7) of the tubes and the sealings (11) attached to them to the valve ball and by thereafter pressing the casing (8) against the sides of the tubes and by welding the ends (15) of the casing.

7 Claims, 4 Drawing Sheets

BALL VALVE WITH FULL OPENING AND A METHOD FOR ITS MANUFACTURE

The invention relates to a method for manufacturing a ball valve with full opening between two tubes wherein the ends of the tubes will be sealed against the valve ball opening and closing the valve and rotating about its axle and the sleeve-like casing surrounding the valve ball and the ends of the tubes are fixed by their ends to the sides of the tubes as an element holding the valve together. In addition, the invention relates to the ball valve with full opening to be provided by the method.

By the full opening of the ball valve is meant that the sizes of the flow openings of the valve ball substantially correspond to the cross sections of the tubes, whereby the valve will not substantially make the flowpath formed by the tubes any narrower. The valve is operated by rotating the valve ball by means of a spindle in the direction of the tubes about its vertical axle, so that the valve stays open during the period of time the flow openings of the ball are facing towards the tubes and stays closed whenever the closed sides of the ball are facing towards the tubes.

BACKGROUND OF THE INVENTION

Besides the ball valves with full openings, there are ball valves with a reduced opening on the market, wherein the flow openings of the valve ball are, in other words, smaller than the diameter of the flow channel formed by the tubes. In some of the valve structures of this type there is not even any separate casing around the ends of the tubes and the valve ball, the casing being integrated with the tube parts formed by the flow channel provided by the valve. These well known solutions have been described, e.g. in the FI declaration publication 71609 and in the U.S. Pat. No. 4,545,564.

According to the state of art technology, the manufacturing of a ball valve with full opening takes place so that, in order to provide the sealing box required by the seals between the tubes and the valve ball, in the ends of the tubes, the inner diameter of which corresponds to the diameters of the flow openings, interior widenings are cut by lathe. The casing around the valve ball and the tube ends is fixed by welding to the sides of the tubes so that the sealing boxes will stay inside the space defined by the casing. An example of this known solution is presented, among others, in the FI patent application 3532/72. The solution requires that the casing of the tube has to be thick enough to enable the forming of a sealing box within it. In practice, the process has been followed so that the casing in the tube end of the valve has been thicker than in other parts of the tube, however, resulting in the disadvantage of heavy structure and in high costs of manufacturing. Furthermore, in connection with the welding of the casing on the valve ball and the tubes, there has been a danger of welding splashes entering under the casing where they can harm the movement of the valve ball that is the basis of the operation of the valve.

The object of this invention is to provide a solution with which said problems of known ball valves with full opening are eliminated. The manufacturing method of the valve according to the invention is characterized by that, in both tube ends, a substantially stepped protruding part is formed surrounding the ends, including an annular sealing, that the tube ends and the sealings are brought against the valve ball on its opposite sides, that the sleeve-like ends of the casing are reduced by the pressure applied to them to make their inner diameters match with the outer diameters of the tubes, and that, finally, the ends of the casings are attached to the sides of the tubes inserted in the casings.

The solution according to the invention makes the valve structure lighter and saves material compared with the known ball valves with full opening. Also, the need of forming and machining the tube ends is reduced. When the fixing points of the valve casing are located, as seen from the valve ball, behind the stepped extensions of the heads of the tubes the welding seams around the tubes attaching the casing are shortened, while the stepped protrusions of the tube ends operate as splash guards that makes the entry of welding splashes inside the space defined by the casing more difficult.

SUMMARY OF THE INVENTION

One embodiment of the invention is characterized by that both ends of the tubes are extended by forming a stepped fold in the sleeve of the tube in the sealing box of which, formed in the sleeve, an annular sealing is provided, that the extended ends of the tubes with their sealings are brought against the valve ball and that then the ends of the sleeve-like casing are pressed against the sides of the tubes inserted in the casing. The assembling order of the valve is then different from that previously known in that the tube ends extended to become sealing boxes, and the sealings provided in them, have first to be attached to the valve ball and it is not until this is completed that the casing can be bent around the valve ball and the sealing boxes to be welded by their ends to the sides of the tubes. The extended parts of the tubes are an obstacle to the previous process where the sleeve-like casing could beforehand be pressed by its ends so that it approximately matched the outer diameters of the standard sized tubes.

According to the invention, the annular sealing may also locate outside the tube end so that it forms a stepped protrusion from the sleeve surface of the tube. Then, there are two alternative ways to assemble the valve, differing from each other particularly with regard to the order of assembly of the components of the valve structure. It is possible to proceed so that an annular sealing is fixed on the outer surface of the sleeves of both tubes, that the tube ends with their sealings are brought against the valve ball, that the ends of the sleeve-like body surrounding the valve ball and the tube ends are then pressed against the sides of the tubes and that, finally, the ends of the body are secured or, alternatively, so that the annular sealings are brought against the valve ball, that the ends of the sleeve-like body are pressed to bring their inner diameters to match the outer diameters of the tubes, that the tubes are then inserted to the body via opposite ends of the body and that their ends are brought, via the inside of the sealing rings, against the valve ball and that, finally, the ends of the body are secured to the sides of the tubes. In the last mentioned alternative, before the tubes are installed in their locations, the sealings may be kept against the valve ball by a removable fixing means directed throught the flow opening of the ball.

According to the invention, the pressing of the sleeve-like body, in order to reduce its ends, can be arranged by molding blocks moving in the longitudinal direction of the tube and forced around the body. The molding blocks directed towards each other from opposite sides of the valve can then be arranged to crash against each other in the end of the pressing process where spindle rotates about the valve in the middle of the valve.

The ball valve with full opening according to the invention, locating between two tubes where the ends of the tubes are sealed against the valve ball rotating about its axle and opening and closing the valve, and where the valve ball and the tube ends are surrounded by a sleeve-like casing fixed by its ends in the sides of the tubes so that it operates as an element keeping the valve together, is characterized by that a stepped protrusion is formed in the circumference of the ends of both tubes, comprising an annular sealing, and that the casing that has been reduced towards the ends is secured to the sides of the tubes so that the valve ball and the protruding ends of the tubes with their sealings are within the space defined by the casing.

In the valve, the protrusion of the end of the tube may be made by bending the sleeve of the tube when the annular sealing is arranged to the sealing box in the sleeve or, alternatively, the annular sealing may be secured protrudingly on the outer surface of the sleeve of the tube. In the last mentioned case, the inner surfaces of the tubes, without any sealing, may be smooth when their flow resistance is lower and they have no slots, that are very easily contaminated and difficult to clean, between the sealing and the lugs or steps of the surface supporting them.

The outer sealing of the sleeve of the tube may be located in the sealing box formed by the supporting ring around the sealing. The supporting ring is formed so that the sealing box is forming a stepped extension protruding from the outer surface of the tube. The result of this solution is that when the temperature is becoming lower the sealing presses more tightly between the supporting ring and the tube so that the risk of any valve leakage is reduced. The outer surface of the sleeve of the tube may also be provided with a lug supporting the sealing or its supporting ring from the opposite side in relation to the end of the tube, thus keeping the sealing in its place.

BRIEF DESCRIPTION OF THE DRAWINGS

In the following, the invention will be described in detail by examples and referring to the attached drawings where.

BRIEF DESCRIPTION OF THE PREFERRED EMBODIMENT

Figure 1:
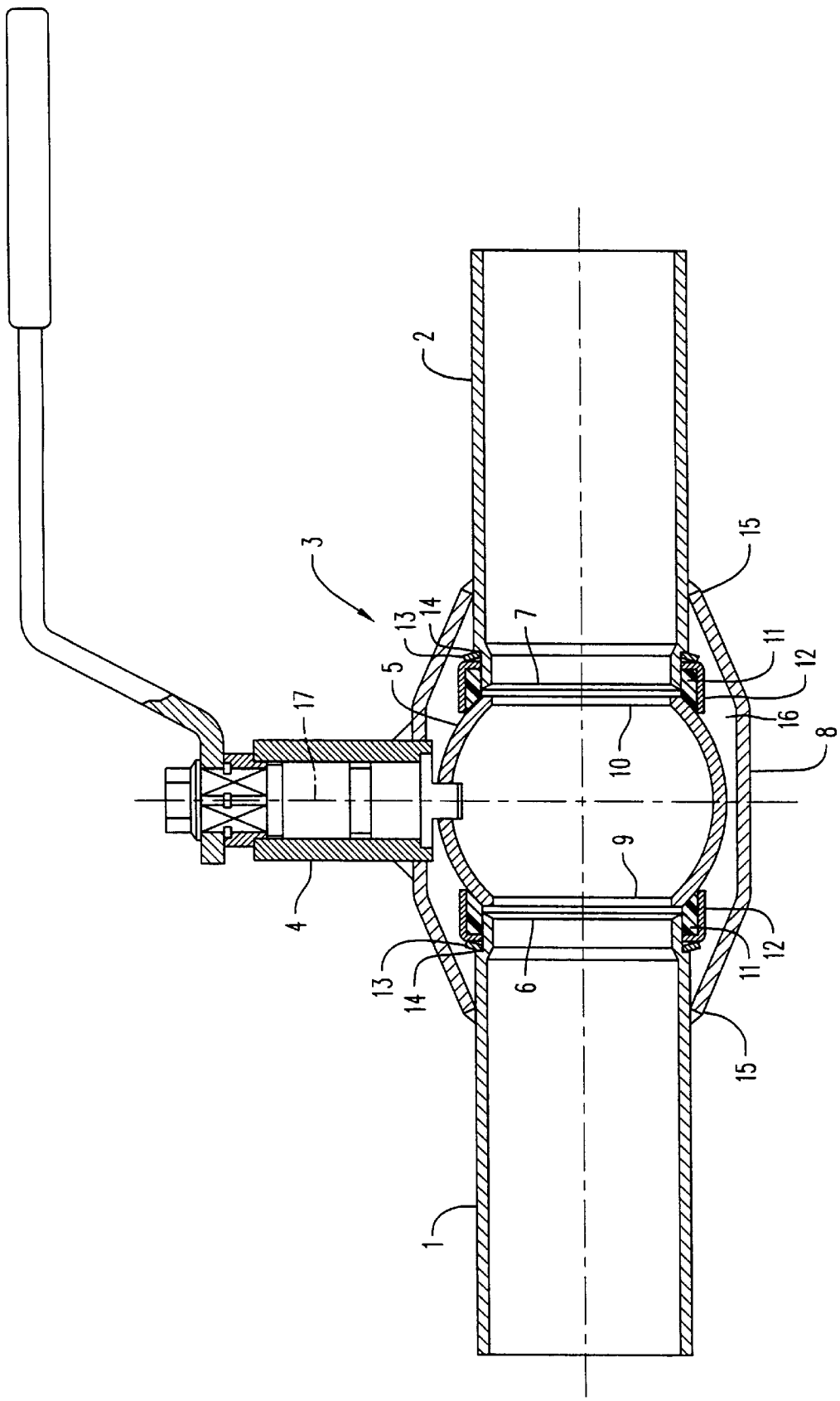
FIG. 1 shows a ball valve with full opening between two tubes, according to the invention.

FIG. 1 shows a ball valve 3 between two tubes 1, 2 with circular cross sections, comprising a valve ball 5 connected with a spindle 4 perpendicular in relation to the tubes, and a sleeve-like casing 8 around the valve ball and the ends 6, 7 of the tubes. The valve ball 5 is hollow and provided with circular flow openings 9, 10 the diameters of which are about the same as the interior diameters of the tubes 1, 2, making the flow openings to approximately match with the flow cross surfaces of the tubes. Both ends 5, 6 of the tubes are surrounded by an annular sealing 11 against the outer surfaces of the sleeves of the tubes, located in a sealing box forming a stepped protrusion from the outer surface of the sleeve of the tube and defined by a supporting ring 12 with L-shaped cross section, and sealing the slot between the end of the tube and the flow opening of the valve ball 5. The supporting rings 12 are supported to ring-like springs 13 that are in turn supported by the lugs 14 machined in the outer surfaces of the tubes securing the sealings and the supporting rings. The casing 8 around the valve ball 5 and the ends 6, 7 of the tubes is formed by pressing it to become conically tapered by its ends 15 and fixed to the sides of the tubes 1,2 by welding seams around its circumference so that the ends 6, 7 of the tubes with their sealing boxes are totally retained in the space 16 defined by the casing.

FIG. 1 shows an open valve 3 where the flow openings 9, 10 of the valve ball are facing towards the tubes 1, 2 to enable liquid flow through the valve. The valve is closed by rotating the spindle 4 the valve ball 5 90° about its axle 17 so that the flow openings 9, 10 turn to the sides and the closed sides of the ball turn towards the sealed ends 6, 7 of the tubes.

Figure 2:
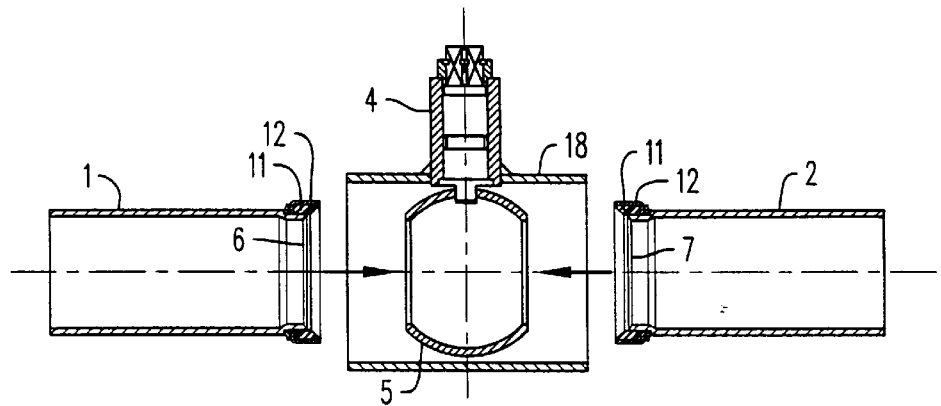
FIGS. 2 to 4 show the different manufacturing phases of the valve shown in FIG. 1.
Figure 3:
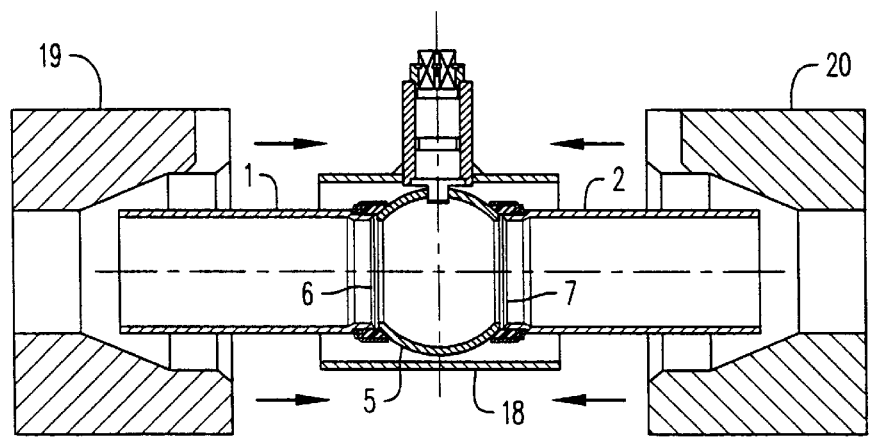
Figure 4:
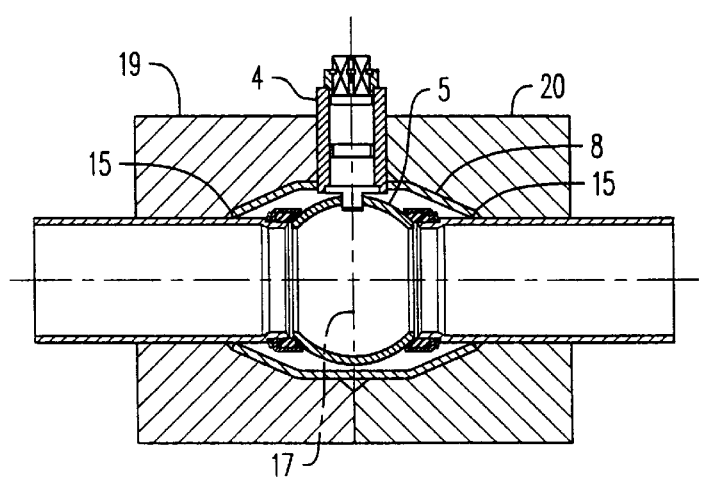

The assembly by phases of the ball valve 3 according to FIG. 1 is shown in the FIGS. 2 to 4. The valve ball 5 and the spindle 4 are fixed to a tube-like casing blank 18 of standard diameter that will be formed to become the casing 8 of the valve. Before this, tubes 1, 2 provided with annular sealings 11, supporting rings 12 and springs are connected to the valve ball 5 and these tubes are inserted according to the arrows shown by FIG. 2 to the casing blanks 18 and sealed to the valve ball flow openings according to FIG. 3. Then a molding is applied to the casing blanks 18 to make out of it the casing 8 around the valve ball 5 and the ends of the tubes 6, 7 by using the molding blocks 19, 20 seen in FIGS. 3 and 4. The molding blocks 19, 20 around the tubes 1, 2 are directed from opposite sides of the valve towards each other in the longitudinal direction of the tubes when their inner surfaces, in the form of a truncated cone, press the casing blank 18 to the corresponding form where the ends of the blocks are pressed against the sides of the tubes 1, 2. The final phase of the pressing process is shown in FIG. 4 where the molding blocks 19, 20 have crashed to each other by the axle 17 of the valve ball and the spindle axle. When the molding blocks 19, 20 have been revomed, the casing 8 that has been pressed from the casing blank 18 and reduced towards its ends 15 is welded to the sides of the tubes 1, 2, resulting in a ball valve 3 between the tubes 1, 2, according to FIG. 1.

Figure 5:
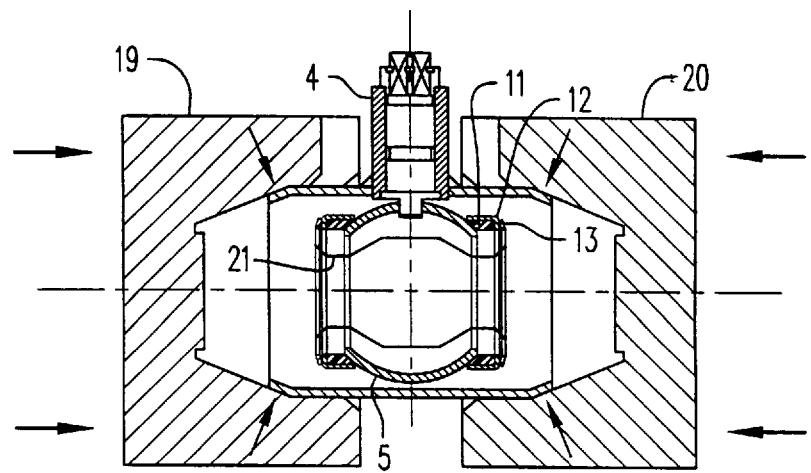
FIGS. 5 and 6 show an alternative manufacturing process of the valve shown in FIG. 1.
Figure 6:
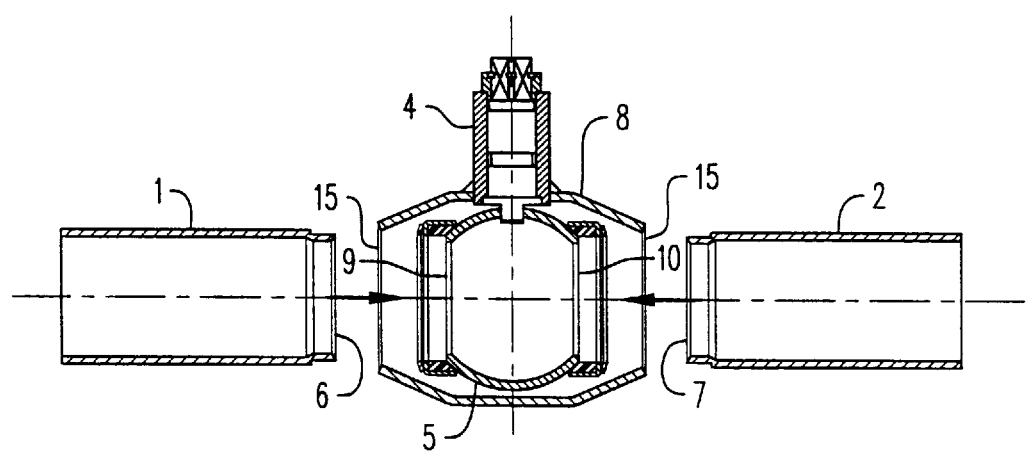

FIGS. 5 and 6 show an alternative process to assemble the ball valve 3 according to FIG. 1. In this case the annular sealings 11, the supporting rings 12, and the ring-formed springs 13 have been fixed by removable, through the valve ball 5 directed fixations 21 with banded structure, around the flow openings 9, 10 as shown in FIG. 5. Then the forming of the casing blank 18 is carried out according to FIG. 5 to make it a casing around the valve ball 5 and the ends of the tubes, using the molding blocks 19, 20 moving against each other. The pressure applied to the casing blank by the molding blocks 19, 20 make the inner diameters of the ends 15 match the outer diameters of the tubes to be connected to the valve ball 5. The formed casing 8 made from the blank and having a reduced conical form in the ends is shown in FIG. 6. After this, the tubes 1, 2 to be connected to the valve ball 5 are inserted through the opposite ends 15 to the casing and the ends 6, 7 of the tubes are arranged in the ring sealings 11 so that they come against the flow openings of the valve ball. Finally, the ends 15 of the casing are welded to the sides of the tubes 1, 2.

Figure 7:
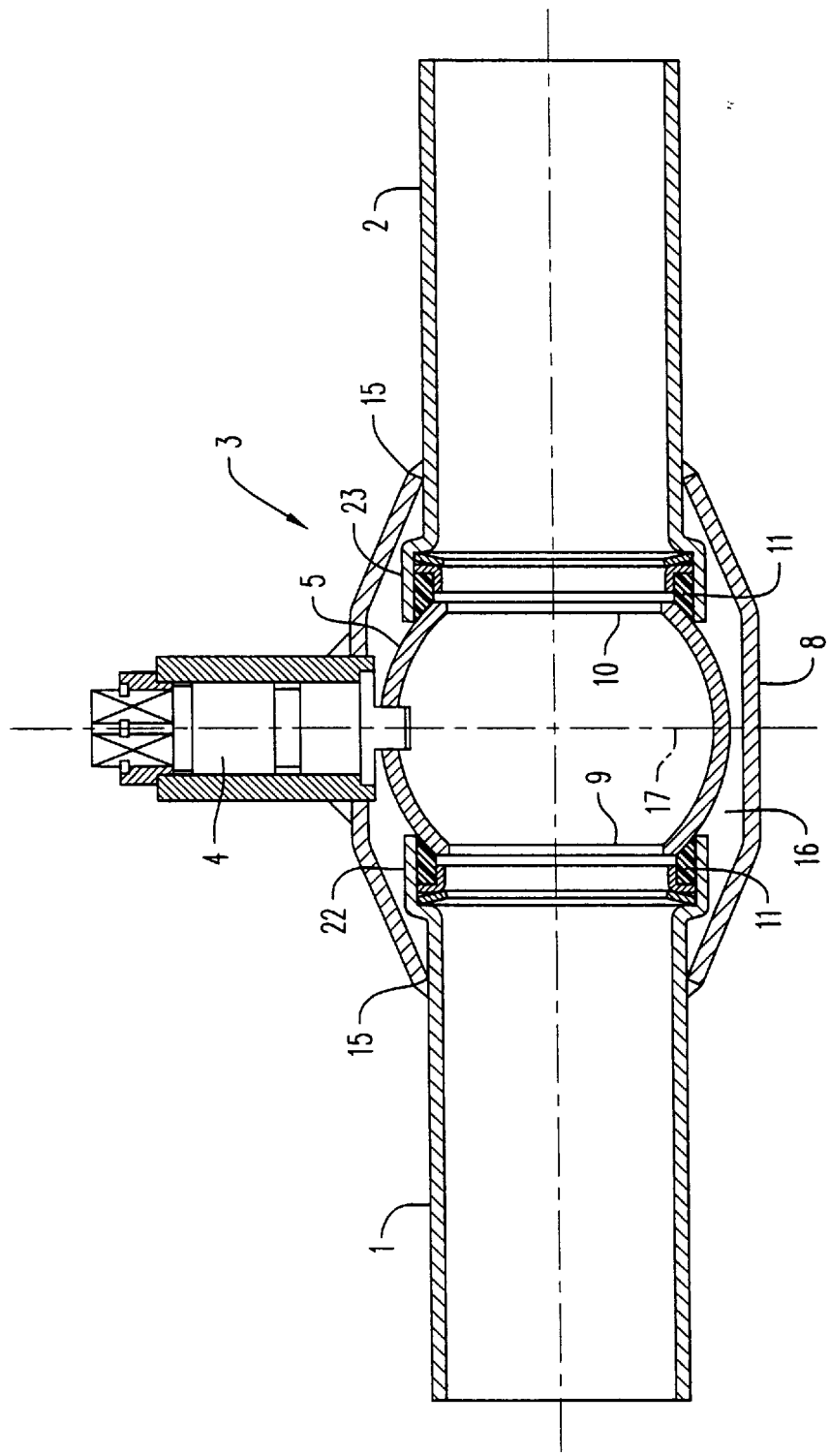
FIG. 7 shows another ball valve with full opening according to the invention.

The ball valve 3 with full opening between two tubes 1, 2 with circular cross sections shown in FIG. 7 is similar to the one shown in FIG. 1, as far as the spindle 4, the valve ball 5, and the casing 8 are concerned. In comparison with FIG. 1 the difference is in that, during the casting or the stretching thereafter of the tubes, stepped extensions 22, 23 are formed in the ends of the tubes 1, 2 whereby sealing boxes have been provided for the annular sealings 11 between the tubes and the valve ball 5. The material thickness of the sleeve of the tube by the extensions 22, 23 is the same as in the other parts of the tubes 1, 2, or not more than slightly smaller, due to the stretching applied to the sleeve in connection with the forming of the extensions.

The operation and assembling by phases of the ball valve 3 according to FIG. 7 are similar to those shown in connection of FIGS. 1 to 4.

For those skilled in the art, it is evident that the different application forms are not limited by the previous examples but can be varied within the attached claims.

I claim:

1. A method for forming a ball valve with full openings between two tubes, said valve including a valve ball, a sleeve-like casing, and an axle, and said tubes having ends and sides, wherein said ends of said tubes are sealed against said valve ball that opens and closes said valve by rotating about said axle, and wherein said sleeve-like casing is located around said valve ball and said ends of said tubes and is fixed to said sides of said tubes to hold said valve together, said method comprising:

forming substantially stepped protrusions at said ends of said tubes adapted to accept an annular sealing, bringing said ends of said tubes against opposite sides of said valve ball, reducing an inner diameter of ends of said sleeve-like casing located around said valve ball by applying pressure until said inner diameter of said ends of said sleeve-like casing approximately match an outer diameter of said tubes, and attaching said ends of said sleeve-like casing to said sides of said tubes inserted in said sleeve-like casing.

2. A method according to claim 1, wherein said ends of said tubes are extended by forming a stepped fold to provide a sealing box adapted to accept an annular sealing.

3. A method according to claim 1, wherein an annular sealing is attached to an outer surface of said tubes so that said annular sealing substantially protrudes from said outer surface of said tubes.

4. A method according to claim 3, wherein said annular sealing is surrounded by an outer supporting ring.

5. A method according to claim 1, wherein said annular sealing is positioned against said valve ball, said inner diameter of said ends of said sleeve-like casing is reduced, said tubes are then inserted through opposite ends of said sleeve-like casing until said ends of said tubes are positioned against said valve ball, and said ends of said sleeve-like casing are attached to said sides of said tubes.

6. A method according to claim 1, wherein said inner diameter of said ends of said sleeve-like casing is reduced by forcing molding blocks around said sleeve-like casing and moving said molding blocks in a longitudinal direction in relation to said tubes.

7. A method according to claim 1, wherein said ends of said sleeve-like casing are attached to said sides of said tubes by welding.

* * * * *